UNITED STATES PATENT OFFICE.

LOUIS H. G. EHRHARDT, OF NEW YORK, N. Y.

IMPROVEMENT IN DECOLORIZING RAW SUGARS.

Specification forming part of Letters Patent No. 117,161, dated July 18, 1871.

*To all whom it may concern:*

Be it known that I, LOUIS H. G. EHRHARDT, of the city of New York, in the county and State of New York, have invented a new and Improved Process for Decolorizing Raw Sugar, Sirups, and Molasses; and I hereby declare that the following is a full, clear, and exact description of the same.

My invention consists in an improved process for decolorizing raw sugar, sirup, and molasses, whereby I am enabled to reduce such raw material into a pure and decolorized state with little expense and in a most expeditious manner.

I take the desired quantity of the raw material and reduce it in the usual manner to a solution, differing in its concentration, as may be adopted in the different refineries. I then add lime-milk, in larger and smaller quantity according to the grade of impurity of the sugar to be refined—for instance, with the better and purer quality this amounts to thousandths of parts, whereas with the darker qualities to hundredths of parts; as, for instance, for a very dark molasses, I take, say, molasses, one hundred pounds; lime-milk, four pounds.

The lime-milk is prepared by taking a quantity of burned lime and mixing with it sufficient water to reduce it to a thin paste. I may here remark that I prefer to use lime, as it is very cheap and easily obtained, but other equivalent talcose substances might be used.

After the sugar and lime-milk are intimately mixed and placed in a suitable vessel I charge the mixture with carbonic acid until no more alkaline reaction is shown. Various kinds of apparatus for generating carbonic-acid gas are well known in the market and need no particular mention here. To obtain the best results I heat the mixture, previously to being charged with carbonic acid, to a temperature of, say, 25° to 30° centigrade. I finish the operation by boiling, which process converts the salts contained in the mixture into carbonates, which precipitate. After this the molasses is filtered mechanically or otherwise, or, if very liquid, merely decanted, as the impurities, with the carbonates, remain at the bottom. The molasses will now be found decolorized and pure in taste, not reminding one at all of the previous disagreeable taste of the raw material, which shows the great purifying effects of this process. The sirups thus treated are as clear and perfect as they possibly could be made by means of blood or egg-albumen, hitherto used.

The chemical action of this process is as follows: The carbonate of lime forms, with the coloring matter in the sirup or molasses, an insoluble mass, which I have found to be the case by experimenting with the precipitate after removing the sirup. It shows a color similar to, but of a more decided character than, that of the material worked upon, and no amount of washing diminishes the quantity, nor does the water become colored. A surplus of carbonic acid does not affect the insolubility of the precipitate.

I am aware that lime has been used by different inventors and manufacturers, but for an entirely different purpose, in a different manner, and producing different chemical results. It is used to prevent fermentation, but not to decolorize.

In all the processes hitherto used filtering through charcoal was necessary to decolorize, and even then the alkaline salts remained in the sugar and reduced its quantity and impaired its quality. In my process it will be observed that animal charcoal is not used, and all the alkaline substances are precipitated and remain insoluble.

The lime passing with the sugar through the charcoal in the processes heretofore practiced, sulphite of lime and carbon are formed, all more or less soluble. The molasses thus treated would lose in quantity as well as in quality, a large percentage of the sugar being converted into starch or grape-sugar, whereas in my process all the crystallizable sugar is obtained colorless and pure.

What I claim as my invention, and desire to secure by Letters Patent, is—

The process of decolorizing the raw solution of sugar by mixing the same with a suitable quantity of lime-milk and charging the mass with carbonic-acid gas, substantially in the manner herein specified.

L. H. G. EHRHARDT.

Witnesses:
M. M. LIVINGSTON,
T. B. BEECHER.